(12) United States Patent
Franzblau

(10) Patent No.: US 7,271,329 B2
(45) Date of Patent: Sep. 18, 2007

(54) COMPUTER-AIDED LEARNING SYSTEM EMPLOYING A PITCH TRACKING LINE

(75) Inventor: Charles A. Franzblau, Tampa, FL (US)

(73) Assignee: Electronic Learning Products, Inc., Tampa, FL (US)

( * ) Notice: Subject to any disclaimer, the term of this patent is extended or adjusted under 35 U.S.C. 154(b) by 206 days.

(21) Appl. No.: 11/137,025

(22) Filed: May 25, 2005

(65) Prior Publication Data

US 2005/0262989 A1 Dec. 1, 2005

Related U.S. Application Data

(60) Provisional application No. 60/576,233, filed on May 28, 2004.

(51) Int. Cl.
*G04B 13/00* (2006.01)
*G10H 7/00* (2006.01)

(52) U.S. Cl. .................. 84/609; 84/477 R; 84/454; 84/649

(58) Field of Classification Search ............ None
See application file for complete search history.

(56) References Cited

U.S. PATENT DOCUMENTS

| | | | |
|---|---|---|---|
| 4,024,789 A | 5/1977 | Humphrey et al. ........... 84/477 |
| 4,546,687 A | 10/1985 | Minami ..................... 84/1.28 |
| 5,052,264 A | 10/1991 | Dueweke ..................... 84/470 |
| 5,208,413 A | 5/1993 | Tsumura et al. ............. 84/615 |
| 5,287,789 A | 2/1994 | Zimmerman .................. 84/477 |
| 5,501,130 A | 3/1996 | Gannon et al. .............. 84/454 |
| 5,525,062 A | 6/1996 | Ogawa et al. .............. 434/307 |
| 5,811,708 A | 9/1998 | Matsumoto .................. 84/610 |
| 5,817,965 A | 10/1998 | Matsumoto .................. 84/610 |
| 5,876,213 A | 3/1999 | Matsumoto ................. 434/307 |
| 5,906,494 A | 5/1999 | Ogawa et al. ............. 434/307 |
| 6,062,868 A | 5/2000 | Toriumi ..................... 434/407 |
| 6,337,434 B2 | 1/2002 | Oren-Chazon ............... 84/478 |
| 6,417,435 B2 | 7/2002 | Chantzis et al. ............. 84/477 |
| 6,572,381 B1 | 6/2003 | Tsai ........................ 434/307 |
| 6,617,503 B2 | 9/2003 | Geopfert .................... 84/461 |
| 6,725,108 B1 | 4/2004 | Hall .......................... 700/94 |
| 6,727,417 B2 | 4/2004 | Oren-Chazon ............... 84/470 |
| 6,869,287 B1 | 3/2005 | Tadlock et al. ............. 434/178 |
| 2002/0152877 A1* | 10/2002 | Kay .......................... 84/609 |
| 2005/0241462 A1* | 11/2005 | Hirano ....................... 84/600 |

OTHER PUBLICATIONS

Cantare Systems, Sing & See (Manual for Singing Teachers), 2004.
MIDI Manufacturers Association, The Complete MIDI 1.0 Detailed Specification, 1995.

\* cited by examiner

*Primary Examiner*—Marlon Fletcher
(74) *Attorney, Agent, or Firm*—Holland & Knight LLP

(57) ABSTRACT

A computer-aided learning system to facilitate a human to control the pitch and rhythm of their voice. In a preferred embodiment for learning how to sing a song in tune, a display provides visual, real-time depiction of the singer's actual pitch compared to the "target" pitch they should be singing, thereby allowing the singer to interactively raise or lower the pitch of their voice.

39 Claims, 18 Drawing Sheets

FIG. 1
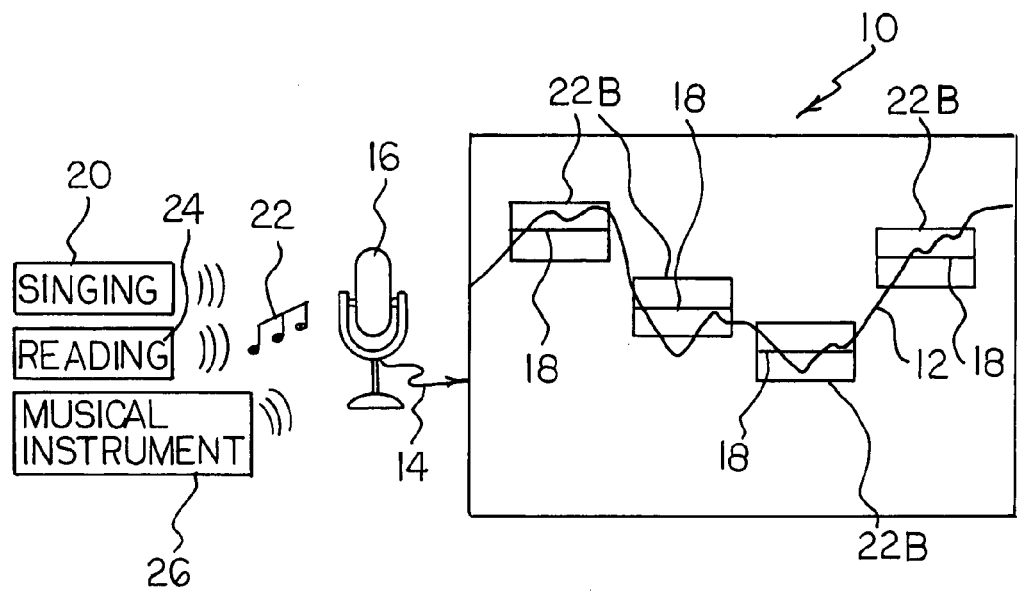
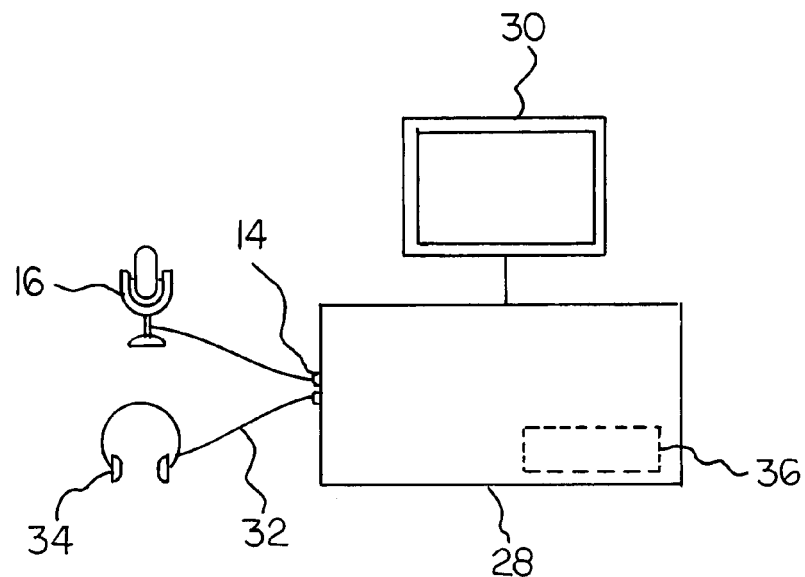
FIG. 2

US 7,271,329 B2

COMPUTER-AIDED LEARNING SYSTEM EMPLOYING A PITCH TRACKING LINE

CROSS-REFERENCE TO RELATED APPLICATIONS

This application claims priority from provisional application 60/576,233, filed May 28, 2004, the disclosure of which is hereby incorporated by reference herein.

BACKGROUND OF THE INVENTION

1. Field of the Invention

This invention relates to computer-aided learning systems for facilitating the annunciation of human voice. More particularly, this invention relates to computer-aided learning systems that facilitates vocalizations such as singing.

2. Description of the Background Art

Presently, there exist many systems for teaching a person how to sing in tune and on beat. Commonly, the prior art systems focus more on the technology employed than the visual presentation to the singer. Accordingly, without an appropriate visual interface for the singer, the prior art systems are of nominal benefit to teaching the singer how to sing in tune and on beat. Representative patents of such prior art systems are disclosed below.

U.S. Pat. No. 5,208,413 entitled "Vocal Display Device" discloses a karaoke device that displays the strength of the singer's voice on a display screen. However, this patent fails to disclose a meaningful visual representation of whether the singer is singing in tune.

U.S. Pat. No. 4,546,687 discloses a "Musical Performance System" in which the vocal signal of the singer and the musical signal of a musical instrument are recorded on separate tracks and then compared, the result of which is displayed via a LED display to indicate the results of such comparison.

U.S. Pat. No. 5,287,789 discloses a "Music Training Apparatus" including one or more tone sources that are displayed as fixed-sized "bars" on a display and the singer's voice is displayed in the form of a pitch tracking line.

U.S. Pat. Nos. 5,525,062 and 5,906,494 disclose a "Training Apparatus for Singing" in which the singer's vocal characteristics are compared with a model vocal characteristic to evaluate the singer's vocal characteristics relative to the model. The result of a comparison of tune error is displayed in the form of color-coded musical notes.

U.S. Pat. No. 5,876,213 discloses a karaoke teaching apparatus that analyzes a singing voice to detect a musical register thereof at which the live vocal part is actually performed.

U.S. Pat. No. 6,417,435 discloses an audio-acoustic proficiency testing device that transduces, captures, measures, compares, analyzes, records and then reports on a singer's performance.

U.S. Pat. No. 6,617,503 discloses a vocal training device including playback modes of melody only, harmony only, melody and harmony and a multi-unit playback of melody, harmony and harmony components.

U.S. Pat. No. 6,725,108 discloses a system and method for interpretation and visualization of acoustic spectra to discover the pitch and timbre of musical sounds via display of a pitch tracking line.

Finally, U.S. Pat. No. 4,024,789 discloses a tone analysis system with a visual display in the form of sheet music containing a musical staff and lighted musical notes.

The disclosure of each of the above-listed patents is hereby incorporated by reference herein.

Commercial prior art systems include TM "Sing & See" produced by Cantare Systems of Surry Hills, Australia. In the TM "Sing & See" system, a pitch tracking line is displayed on a computer screen as the singer sings. Another commercialized implementation includes TM "Singing Tutor" published by Vimas of Kiev, Ukraine that displays a pitch tracking line on a computer screen in real time as the singer sings. Still another includes TM "Sing" formerly published by now-defunct Music Player as well as TM "Karaoke Revolution" and "Audio Mirror" produced by Konami of Tokyo, Japan and ECS Media of Champaign, Ill., respectively. However, TM "Sing", TM "Karaoke Revolution" and TM "Audio Mirror" systems do not display a real time tracking line. For example, in the case of TM "Karaoke Revolution", a visual representation of "pitch tubes" are "lit up" when the singer sings each note in tune, but it does not employ a real time pitch tracking line.

It should be appreciated from the foregoing that the prior art systems teach in general the use of a real time tracking line. However, none of the prior art systems visually quantifies the accuracy of a singer singing in tune or out-of-tune in a manner that teaches the singer how much to raise or lower the tone of their voice as the song is being sung. Accordingly, presently there exists a need for a computer-aided learning system that employs a pitch tracking line and displays it in a way that a singer may, in real time, adjust upwardly or downwardly the tone of their voice while singing.

Therefore, it is an object of this invention to provide an improvement which overcomes the aforementioned inadequacies of the prior art devices and provides an improvement which is a significant contribution to the advancement of the computer-aided learning systems.

Another object of this invention is to provide a computer-aided learning system employing a pitch tracking line enclosed within target pitch boxes to visually quantify singing in tune and on beat.

Another object of this invention is to provide a computer-aided learning system employing target pitch boxes that are reduced in size depending on the desired ease in learning how to sing each note in tune.

Another object of this invention is to provide a computer-aided learning system employing a pitch tracking line and target pitch boxes that may be reduced in length to allow a singer to more easily transition from one note to another.

Another object of this invention is to provide a computer-aided learning system employing a pitch tracking line that determines a singer's comfortable vocal range and transposes the key of a prearranged song accordingly.

Another object of this invention is to provide a computer-aided learning system employing a pitch tracking line that determines a singer's comfortable vocal range and increases or decreases the key of a prearranged song by one or more octaves.

Another object of this invention is to provide a computer-aided learning system employing a pitch tracking line that includes a scoring system for numerically quantifying how accurately a singer sang in tune and rhythm.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises a computer-aided learning system to facilitate a human to control the pitch of their voice such as in singing a song. The invention further facilitates a human to control the rhythm of their voice. Accordingly, the software of the invention teaches one to "sing in tune" and "in rhythm".

The invention includes numerous features that act like "training wheels" for the person who has difficulty carrying a tune. A primary feature is a visual, real-time depiction of the user's actual pitch compared to the "target" pitch they should be singing. The invention further includes a scoring system for measuring and logging improvements in the user's ability to control his pitch.

More particularly, the invention comprises a visual depiction of pitch called the pitch tracking line ("PTL") that shows in real-time the actual pitch the user is singing. Two views of the music are provided; a Graphic View and a Sheet Music View.

The Graphic View is a "Sing Window" and is similar to an abscissa/ordinate or "X/NY" graph. The abscissa X represents time and the ordinate Y-axis represents pitch. Each pitch of each note is shown as a target pitch line to indicate the precise pitch a user should sing. A box is drawn about each target pitch line above and below the target pitch line. The height of the target pitch boxes gives the user a "margin" for error such as plus or minus ½ step (beginner level), plus or minus ¼ step (intermediate level), and plus or minus ⅛ step (advanced level). The lyrics are preferably displayed below the target pitch box. The target pitch line is preferably a colored line (e.g., a red line) and the target pitch box is a preferably a colored box such as light blue.

In the Sheet Music View, the "target pitches" are the note heads and the screen mimics a piece of sheet music complete with staves, notes, rests, key signature, etc.

The invention further comprises a custom vocal range feature that allows a user to set their personal vocal range. The user sings first up and then down. The distance between the high and low pitch tracking lines is then used to establish the top and bottom of the user's vocal range. Once the range is set, it is preferably depicted graphically in the Sing Window by colored horizontal (e.g., green) lines. Each song and exercise is automatically transposed into a key that makes the song easy for the user to sing.

The invention still further includes a scoring feature that indicates what percentage of time the pitch tracking line was within the target pitch boxes, thereby being indicative of the time the song was sung "in tune". In addition to making the margin for error larger or smaller by making the target pitch boxes higher, boxes may be made narrower to define the transition times at the beginning or end of each note during which the user is not scored. This teaches singers to sing on beat (i.e., in rhythm) and to be on pitch at the beginning of each note as they get better.

The invention further includes a tempo change feature that allows slowing the temp of more difficult songs (without changing the key) which will allow the user to more easily learn to sing the song. After he learns to sing it, the tempo can be returned to normal.

The invention further includes breathing indicators. Specifically, in the graphic view, the spots where the user should breathe are indicated with a "B" symbol. This insures that the user has enough breath to get through each phrase on pitch.

Finally, from "pitch-matching" to "a cappella", the invention allows the user to begin learning a song with only the melody and metronome playing (he turns off the accompaniment). In this way the user may focus on matching the pitch of the melody and the proper rhythm only. Once the user can get a good score in this operating mode, the user can add the accompaniment. When that mode is mastered, the user can mute the melody and sing only with accompaniment and metronome. Upon mastering the accompaniment and metronome, the user can mute the accompaniment (and metronome if desired) and sing "a cappella" which means without the support of any audible musical reference points.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 1 is a diagrammatic view of the computer-aided learning system of the invention which graphically displays a pitch tracking line superimposed onto graphical pitch lines contained within target pitch boxes to provide a real time visual feedback of the pitch of one's voice relative to each note of the song being sung to aid the person to sing in tune with the notes of the song;

FIG. 2 is a block diagram of the various components of the computer-aided learning system of the invention;

Similar reference characters refer to similar parts throughout the several views of the drawings.

DETAILED DESCRIPTION OF THE PREFERRED EMBODIMENT

Figure 3:
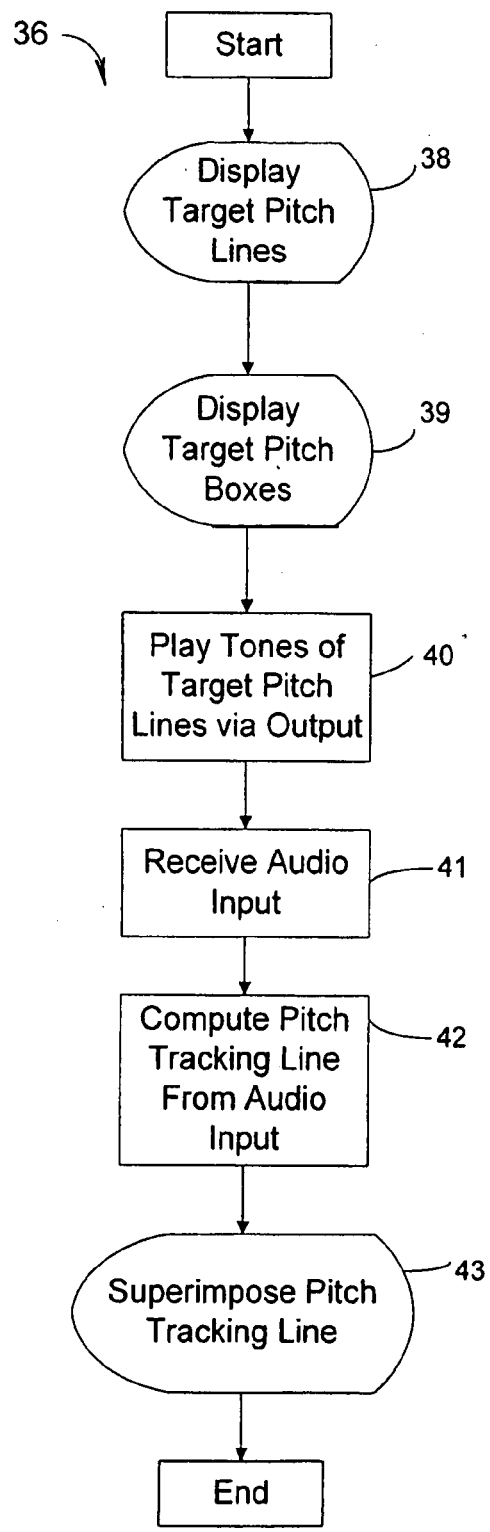
FIG. 3 is a flow chart illustrating the process methodology of the computer program in its preferred embodiment to display the pitch tracking line in real time.

Referring to FIG. 1, the computer-aided learning system 10 of the invention graphically displays a pitch tracking line 12 of an input 14 such as an audible input from a microphone 16 superimposed onto graphical target pitch lines 18 representative of the desired pitches. In the preferred embodiment, the audible input 14 comprises a person who is singing 20 and the graphical display of the target pitch lines represent the musical notes 22 of the song being sung. The superposition of the pitch tracking line 12 over the target pitch lines 18 provides a real-time visual feedback of the pitch of one's voice relative to each note of the song being sung. The invention therefore aids the person to sing in tune with the notes 22 of the song.

The computer-aided learning system of the invention may also be employed for assisting a person such as a child to learn how to read 24 by "singing" the words of the text (or to learn a foreign language). More particularly, it is known that some of the factors affecting a person's ability to read include phonetic awareness, phonics, word recognition and vocabulary, comprehension and fluency. The use of the computer-aided learning system of the invention to sing the words of the text to be learned seems to remarkably enhance the reader's word recognition and vocabulary, comprehension and fluency.

The computer-aided learning system of the invention may also assist a musician to learn how to play a musical instrument 26 by providing a visual feedback of whether the proper notes 22 of the song are being played.

Without departing from the spirit and scope of this invention, this invention may in general be employed for assisting a person, whether an adult or a child, to learn to make audible sounds, whether vocally or with an instrument, by providing a visual real-time feedback to the person of the pitch of the sound superimposed onto the desired or targeted pitch.

More particularly, referring to FIG. 2, the computer-aided learning system 10 of the invention comprises a computer 28 having an internal or external graphical display 30 (e.g., CRT, LCD, Plasma). Computer 28 further includes an audio interface for receiving an input 14 such as from the microphone 16 and for providing an audio output 32 to headphones 34 or speakers. Computer 28 preferably comprises a general purpose personal computer that employs an operating system such as Microsoft Windows, Unix, or Apple Mac OS that runs application software. However, computer 28 may comprise a dedicated computer including suitable hardware and firmware that implements the functionality of the invention 10. Further, the invention 10 may comprise a distributed system wherein the audio input 14 and display 30 comprises a voice-over IP (e.g., Internet video phone) or wireless input (e.g. cell phone with a visual display) and computer 28 comprises a remote server computer running the computer program 36.

Referring to FIG. 3, the invention 10 is embodied in a computer program 36 that in the preferred embodiment runs as application software on the computer 28 (or is hardware/firmware implemented on a dedicated computer) to display 38 the target pitch lines 18 on the display 30, to display 39 the target pitch boxes about the target pitch lines 18, to audibly play 40 the tones of the target pitch lines 18 via the audio output 32 (if desired), to compute 42 the pitch tracking line 12 from the input 14 and to superimpose 43 the pitch tracking line 12 in real time onto the target pitch lines 18 displayed on the display 30.

The computer program 36 determines the user's actual vocal range before displaying 38 the desired pitch lines 18 on the display 30. The computer program 36 then transposes the song to be sung into the optimum key best corresponding to the user's actual vocal range. Apart from transposing the song into a different key (e.g. C to G), the computer program 36 may also or alternatively move the arrangement of the song up or down one or more octaves.

As used herein, the user's vocal range is the range of notes, from lowest to highest, that the user can vocalize or sing comfortably. The two steps in determining one's vocal range is to first sing up from a low note to a high note and second, to sing down from a high note to a low note.

Figure 4:
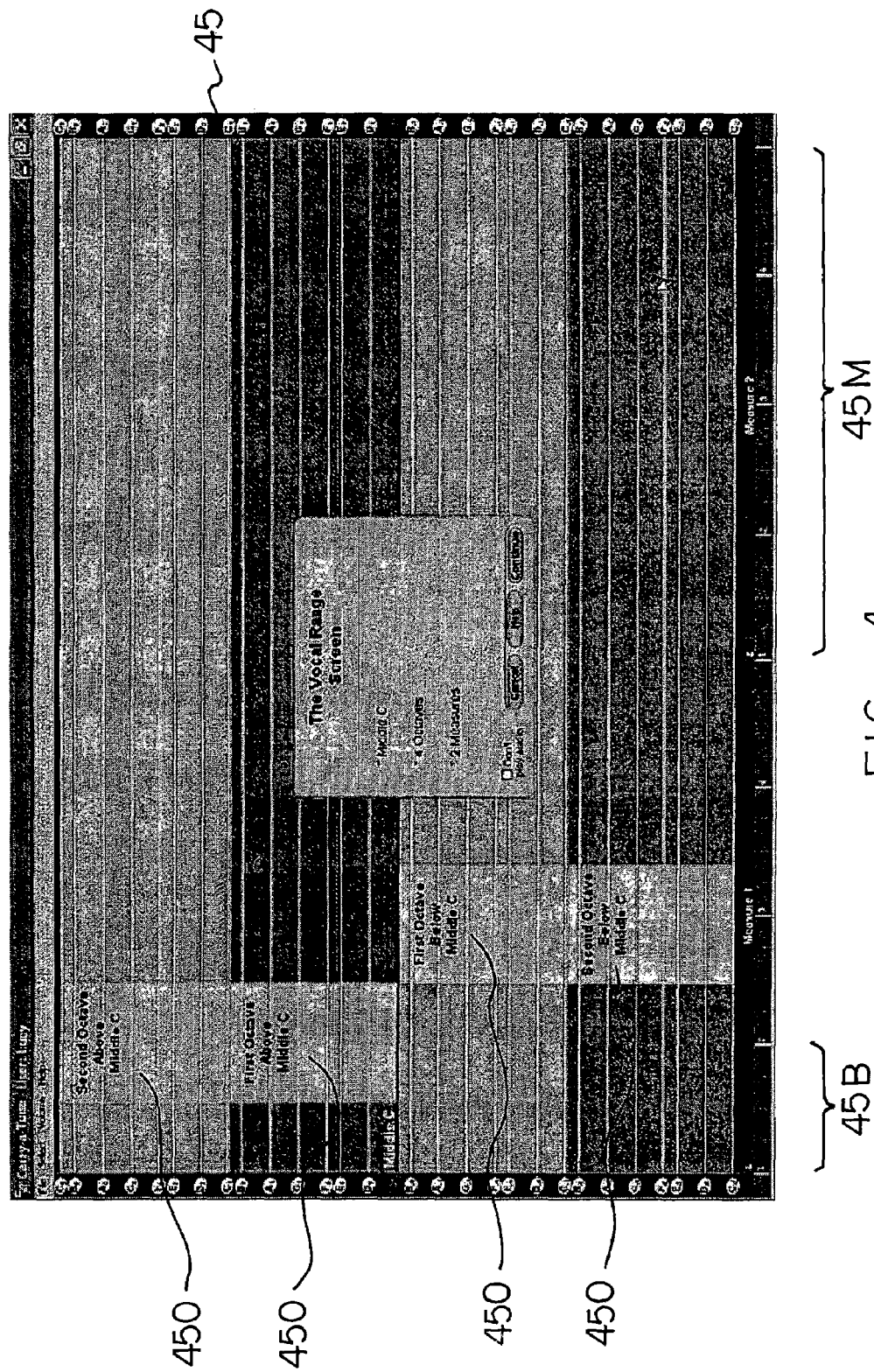
FIG. 4 depicts a vocal range screen and the octaves and measures thereof.

More particularly, FIG. 4 depicts a Vocal Range Screen 45 with four octaves 45O, with the "middle C" in the center. The Vocal Range Screen 45 comprises two measures 45M, indicated at the bottom of the screen as Measure 1 and Measure 2. Each measure 45M is divided into 4 beats 45B.

Figure 4A:
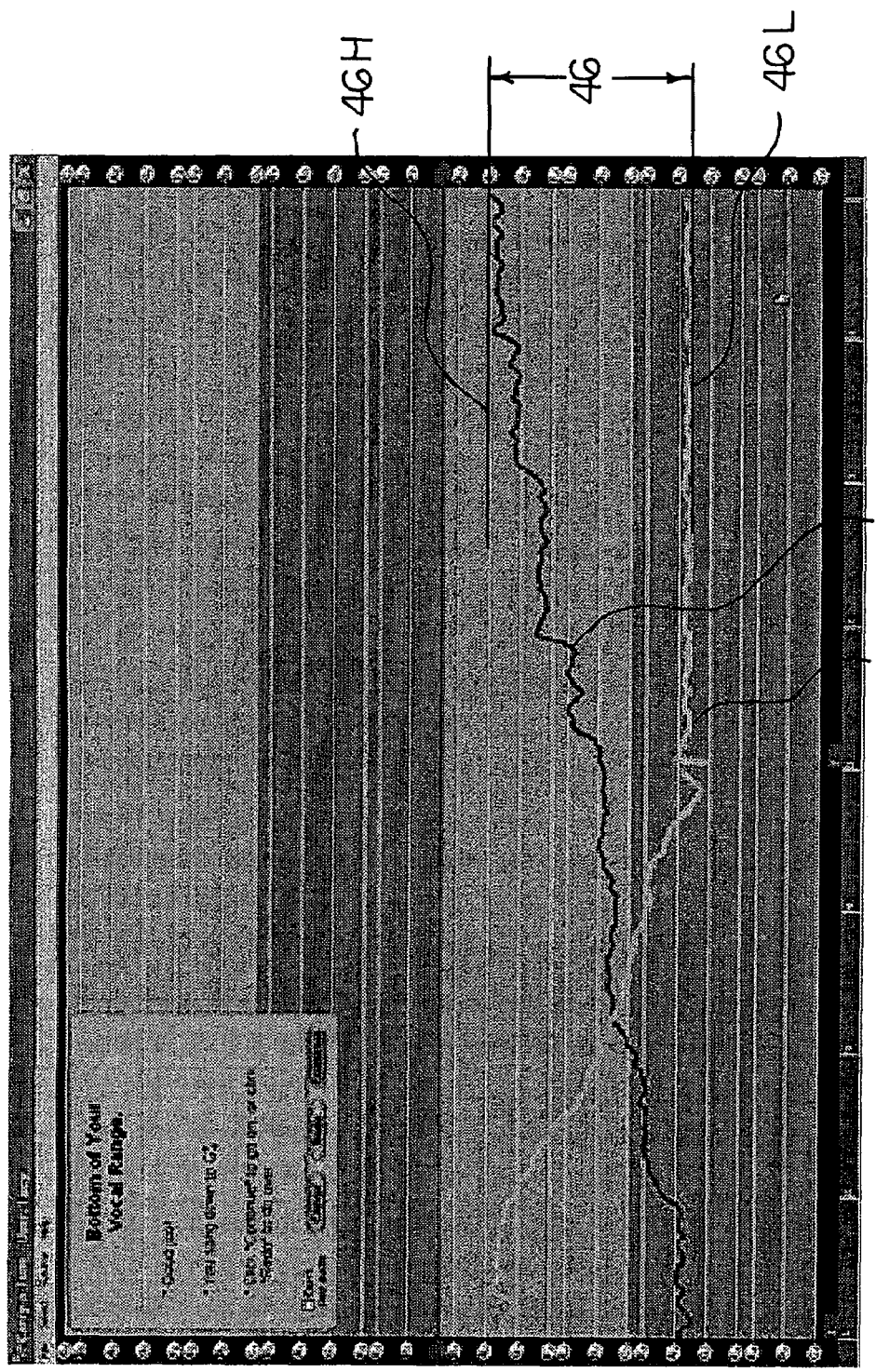
FIG. 4a depicts the vocal range screen used by an exemplary user to compute the user-specific vocal range.

To begin vocal range measuring, four "count-off" or "lead-in" metronome ticks are played via the headphones 34 to inform the user to get ready to sing. After the fourth tick, the user sings from a low tone to the highest note that can be comfortably sung. The process is repeated from a high note to the lowest note that can be comfortably sung. FIG. 4a shows the resulting pitch tracking lines 12L and 12H of an exemplary user that graphically illustrate the highest and lowest notes the user comfortably sang.

The computer program 36 of the invention interpolates a line 46H relative to the highest notes and another line 46L relative to the lowest notes. The user-specific vocal range 46 comprises the difference between the interpolated lines representative of the user's highest and lowest notes. Using this user-specific vocal range, the computer program 36 then transposes the song to the optimum key (or up or down one or more octaves) and displays the transposed target pitch lines and boxes accordingly.

Figure 5:
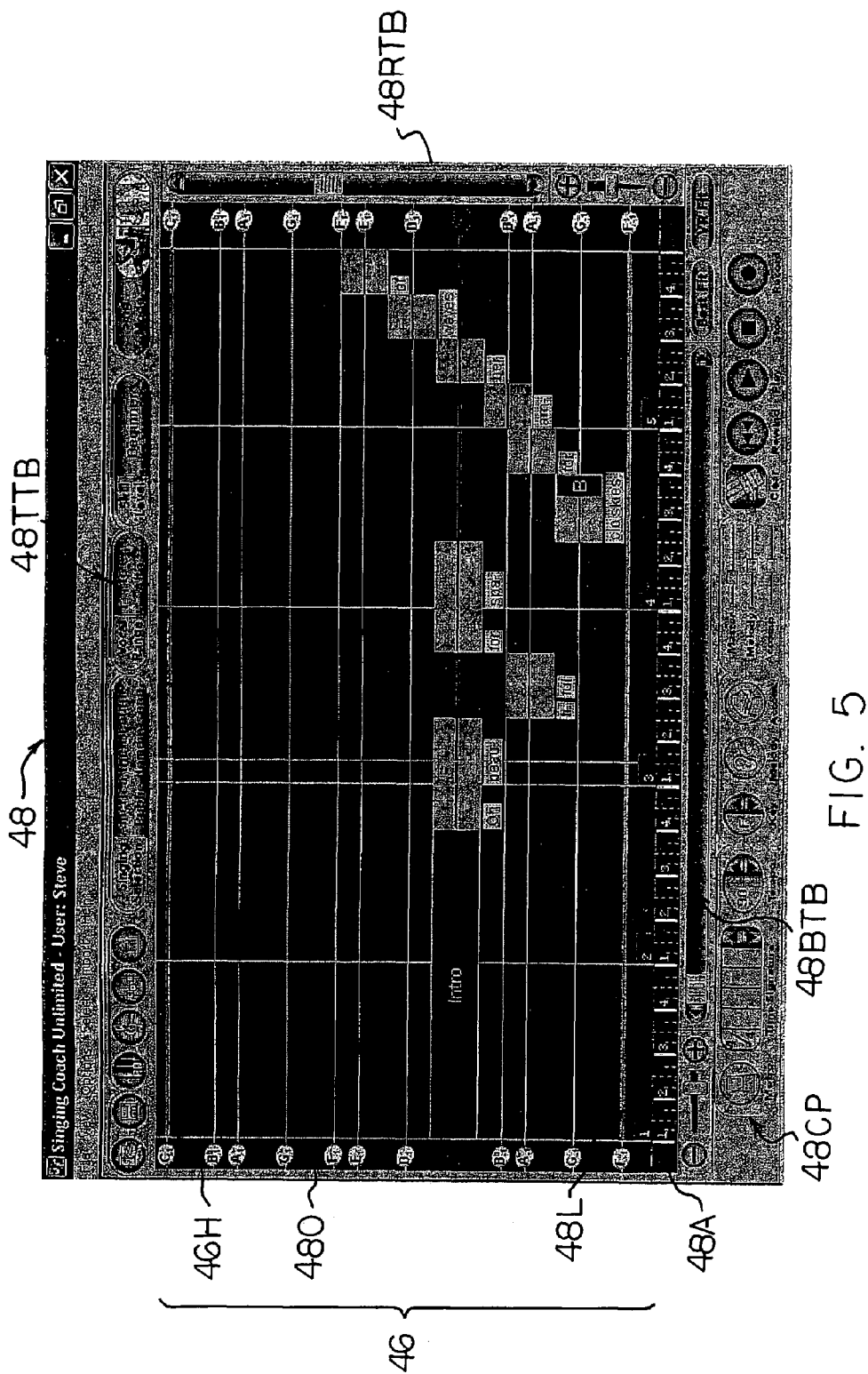
FIG. 5 illustrates the preferred layout of the "sing window" for displaying the target pitch lines and boxes on the display.

FIG. 5 illustrates the preferred layout or "Sing Window" 48 for displaying 38 the desired pitch lines 18 on the display 30. The ordinate 48O of the Sing Window 48 represents the transposed key of the song best corresponding to the user-specific vocal range 46. Diatonic notes are illustrated in the ordinate with normal brightness whereas non-diatonic notes are illustrated in a reduced, grayed-out brightness. The appearance of the diatonic and non-diatonic notes provides a visual display to the user to facilitate singing in tune by visualizing the distance between the notes to be sung. This also facilitates the skills of improvisation. The abscissa 48A of the Sing Window 48 represents the measures 48M and their beats 48B (e.g., for a 4/4 song each measure 48M would include four beats 48b whereas for a 3/4 song each measure 48M would include three beats 48b).

For ease in explanation, the FIG. 5 illustrates the beginning of the song "America The Beautiful" to be sung. Having previously determined, saved and now recalling from memory the user-specific vocal range, the key of the song is transposed to best correspond to such user-specific vocal range 46. The vocal-range-adjusted notes 22 of the song are then displayed 30 in the Sing Window 48 by the target pitch lines 18 displayed horizontally in the center of a generally rectangular target pitch box 22B. The vertical placement of the target pitch line 18 of each target pitch box 22B is aligned relative to the ordinate 48O to correspond to the particular musical note (C, B, A, etc.).

The length 22L of each graphical pitch line 18 and hence the length 22L of each target pitch box 22B corresponds to the beat of the respective note 22 (¼, ½, ¾ beat, etc.) to be sung. The words of the lyrics 22W corresponding to each note 22 of the song are preferably displayed underneath each respective target pitch box 22B. Breath Rests 22R of the song are preferably depicted in the Sing Window 48 as empty boxes that serve as placeholders to signal when to take a breath.

Figure 5A:
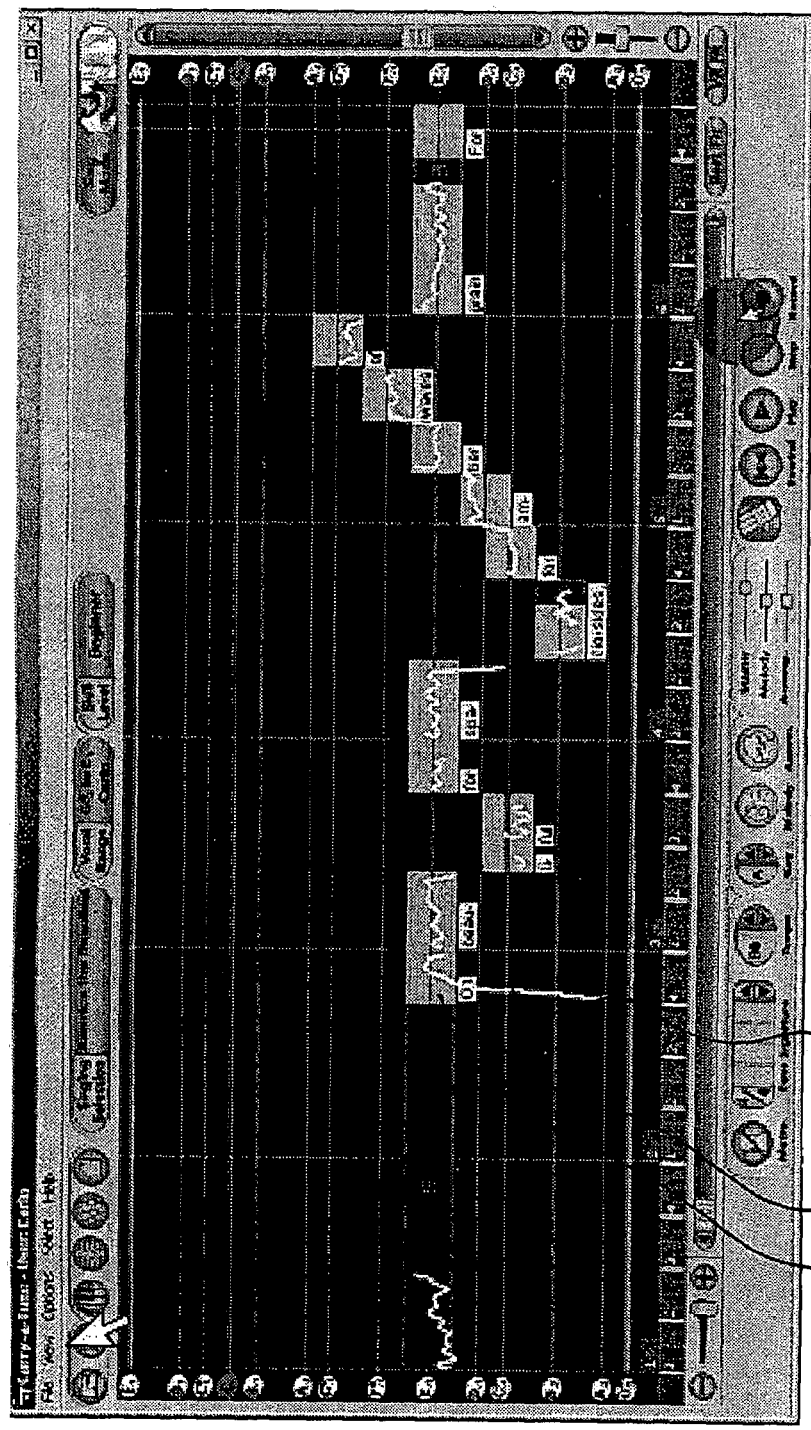
FIG. 5a depicts the "sing window" of FIG. 5 with a user's pitch tracking line superimposed over the target lines and boxes of the song being sung.

As shown in FIG. 5a as the user sings, the pitch tracking line 12 is superimposed onto the Sing Window 48. When singing the song in tune, the pitch tracking line 12 roughly follows the respective target pitch lines 18 for the notes and is therefore encompassed in the respective target pitch boxes 22B whereas when singing the song out of tune or off beat, the pitch tracking line 12 falls outside the respective target pitch boxes 22B. The pitch tracking line 12 being displayed within the target pitch box 22B is visually indicative of singing the song in tune and on beat.

The skill level of singing the song in tune and on beat may be modified by reducing the height 22B of the target pitch boxes 22B and allowing a transition time 22T between adjacent target pitch boxes 22B, respectively.

Figure 5B:
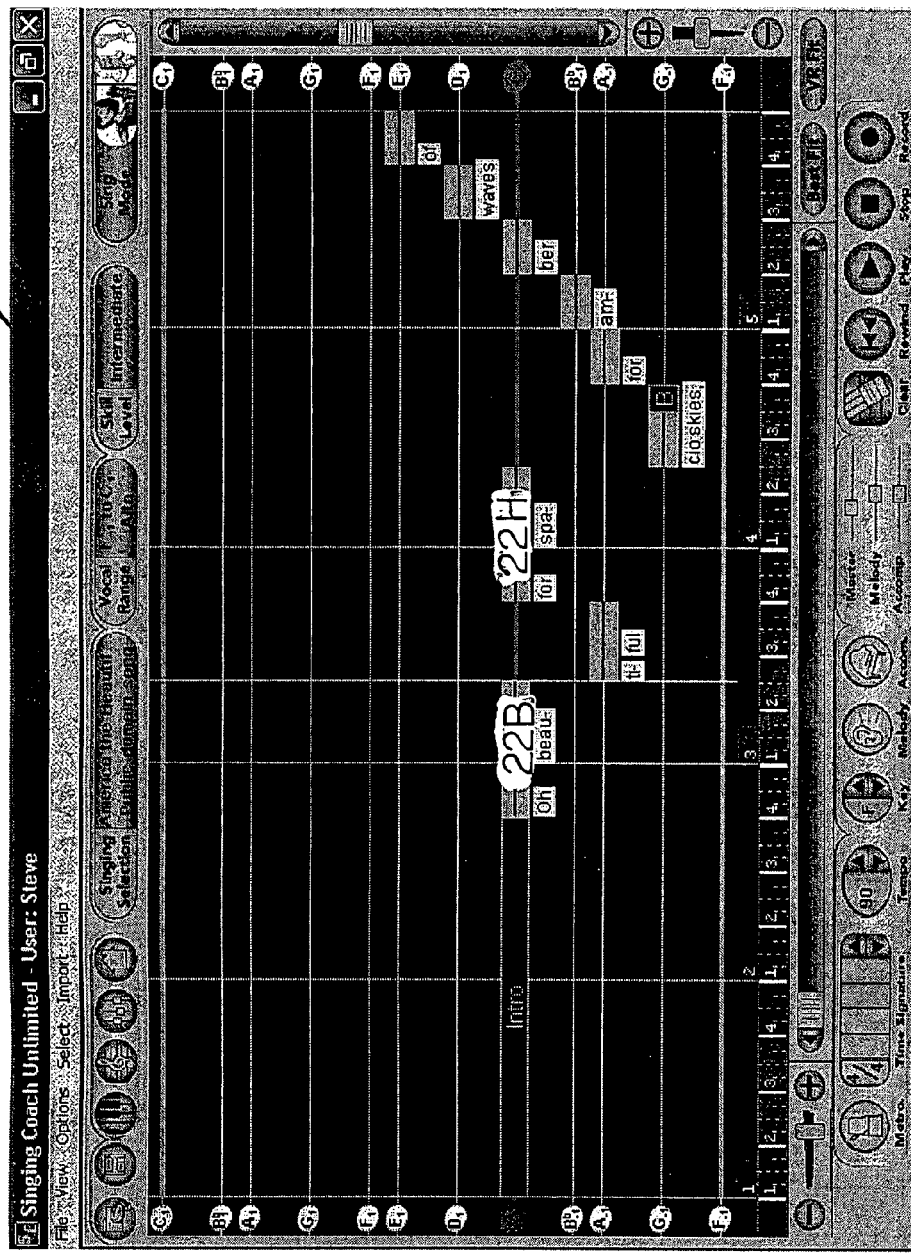
FIGS. 5b and 5c illustrate the "sing window" of FIG. 5a but with reduced height target pitch boxes indicative of intermediate and expert skill levels, respectively.
Figure 5C:
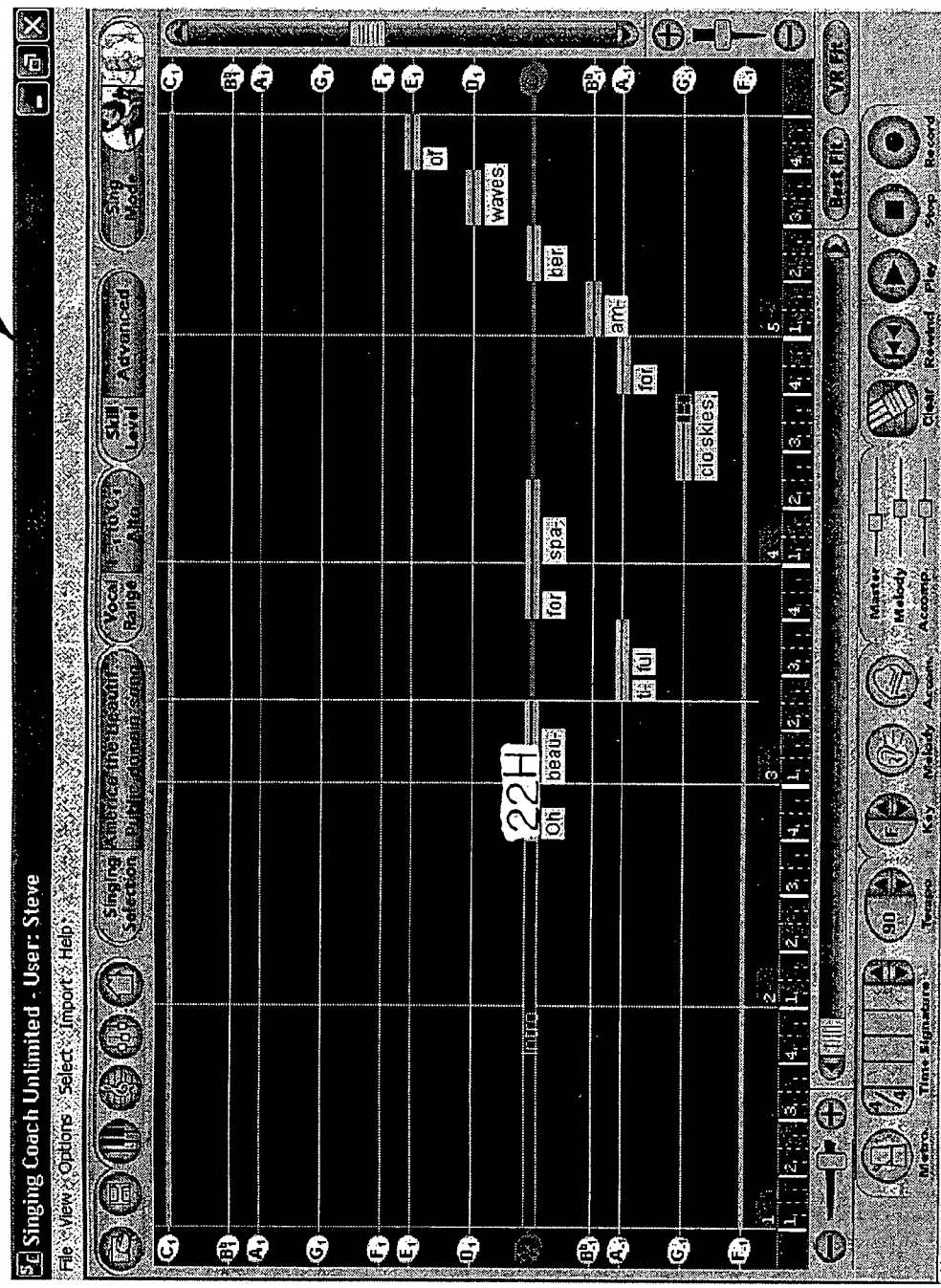

More particularly, for purposes of illustrating the skill levels of singing in tune, FIGS. 5b and 5c illustrate the same pitch tracking line 18 for the "America The Beautiful" of FIG. 5a, but with reduced-height target pitch boxes 22B. In comparison, the tall height 22H, medium height 22H and low height 22H of the target pitch boxes 22B of FIGS., 5a, 5b and 5c, represents a "beginner", "intermediate" and "expert" skill levels, respectively, because more accuracy in staying within the target pitch boxes 22B (i.e., singing in tune) is required as the heights of the target pitch boxes 22B are progressively decreased proportional to the skill level.

Figure 5D:
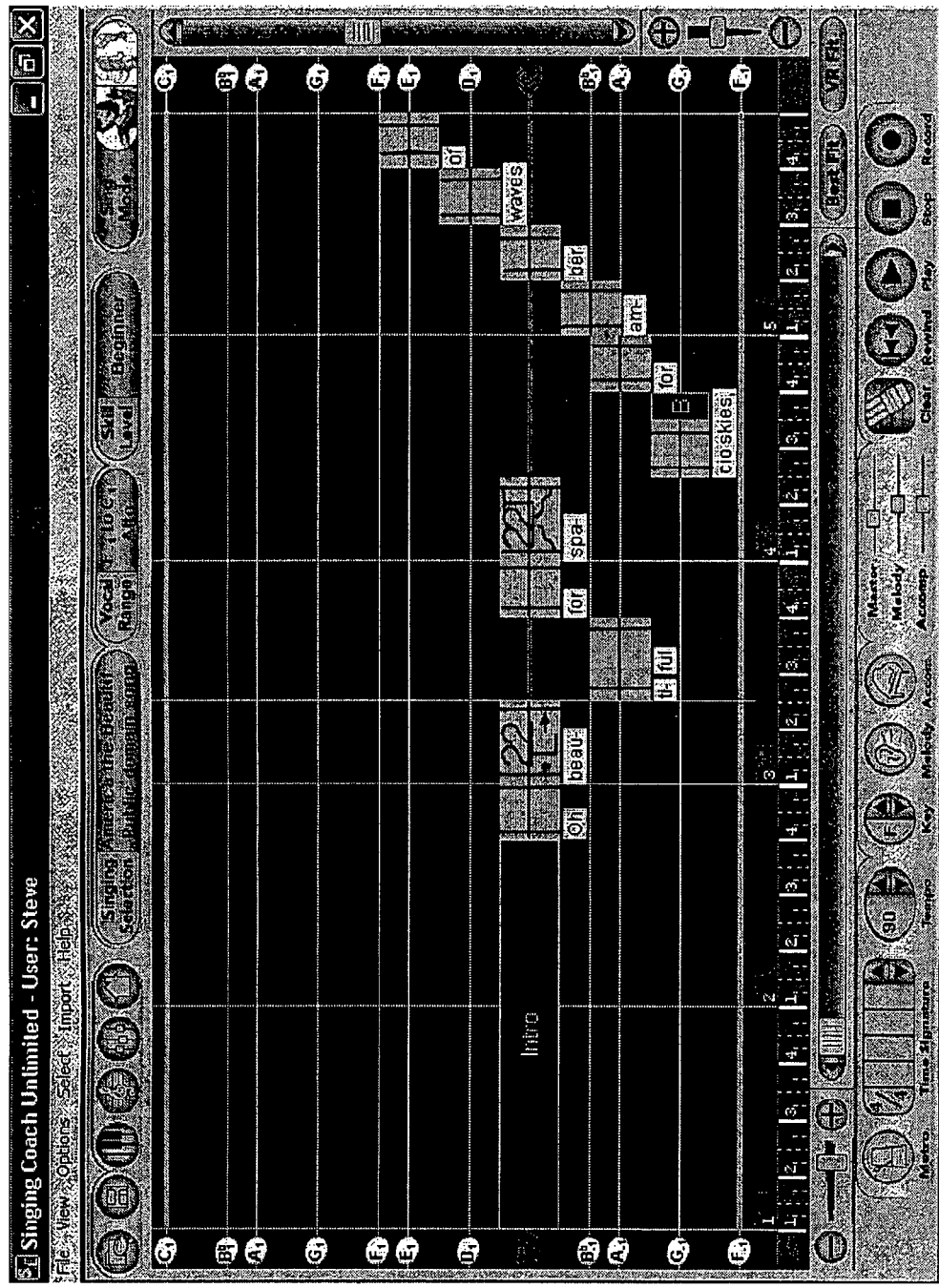
FIGS. 5d and 5e illustrates the same window as FIG. 5a but with the length of the target pitch boxes being increased to reduce the transition time between adjacent notes indicative of "intermediate" and "expert" skill levels, respectively.
Figure 5E:
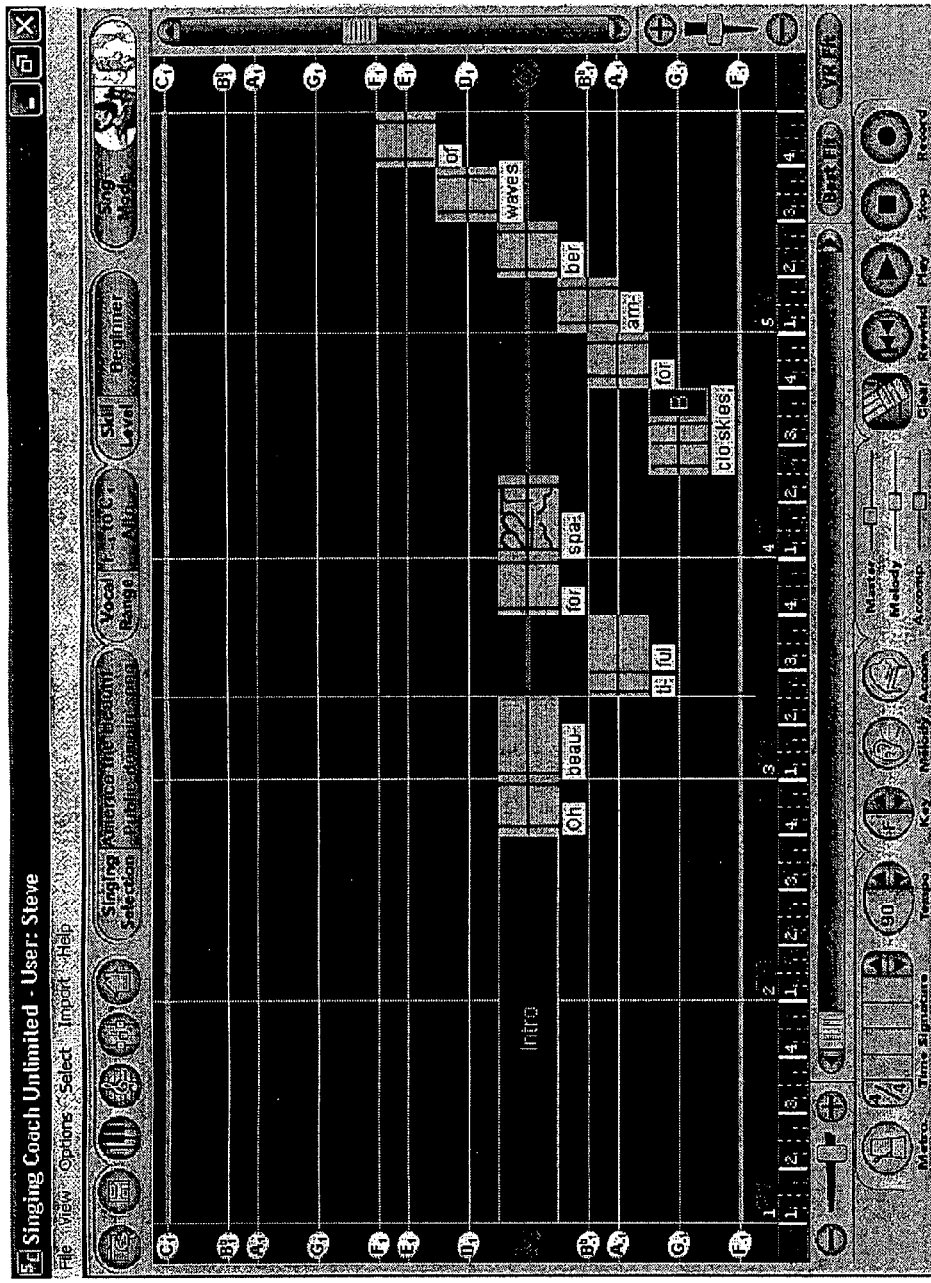

For the purpose of illustrating the skill level to sing on beat (i.e., to quickly transition from one note to another), FIGS. 5d and 5e illustrate "America The Beautiful" of FIG., 5a, but with the length 22L of the target pitch boxes 22B being increased to allow for a transition time between adjacent notes 22B. The transition time between adjacent notes 22B is preferably represented visually by grayed-out or empty transition boxes 22T at the end of each target pitch box 22B or optionally at both the beginning and end of each target pitch box 22B. The length of the transition boxes 22T is preferably visually depicted in relation to 1/16, 1/8 or 1/4 beats indicative of an "expert", "intermediate" and "beginner" skill levels (FIGS. 5e, 5d & 5c), respectively, because, as more transition time is allowed to begin singing the next note, the easier it is to stay within the target pitch boxes 22B (i.e., singing in beat).

The percentage of time of singing the song in tune and on beat (i.e., staying within the target pitch boxes 22B) versus out of tune (going outside the target pitch boxes 22B) or off-beat (transitioning outside the transition boxes 22T), may be used as a way of "scoring" how accurately the user sang the song in tune and on beat. More particularly, the computer program 36 of the invention computes the ratio of the amount of time the user sang in tune and on beat by summing the total time the pitch tracking line 12 fell within the respective target pitch boxes 22B divided by the sum of the lengths of all the target pitch boxes 22B (specifically excluding the transition boxes 22T). The ratio thus represents the user's "score" in singing in tune and on beat.

While it shall be understood that the functionality of the features discussed above may be implemented with many layouts of the Sing Window 48 without departing from the spirit and scope of this invention, the most preferred layout of the Sing Window 48 is illustrated in FIG. 5 in which the Sing Window 48 is surrounded by a top toolbar 48TTB, a right toolbar 48RTB, a bottom toolbar 48BTB and a bottom control panel 48CP.

Figure 6:
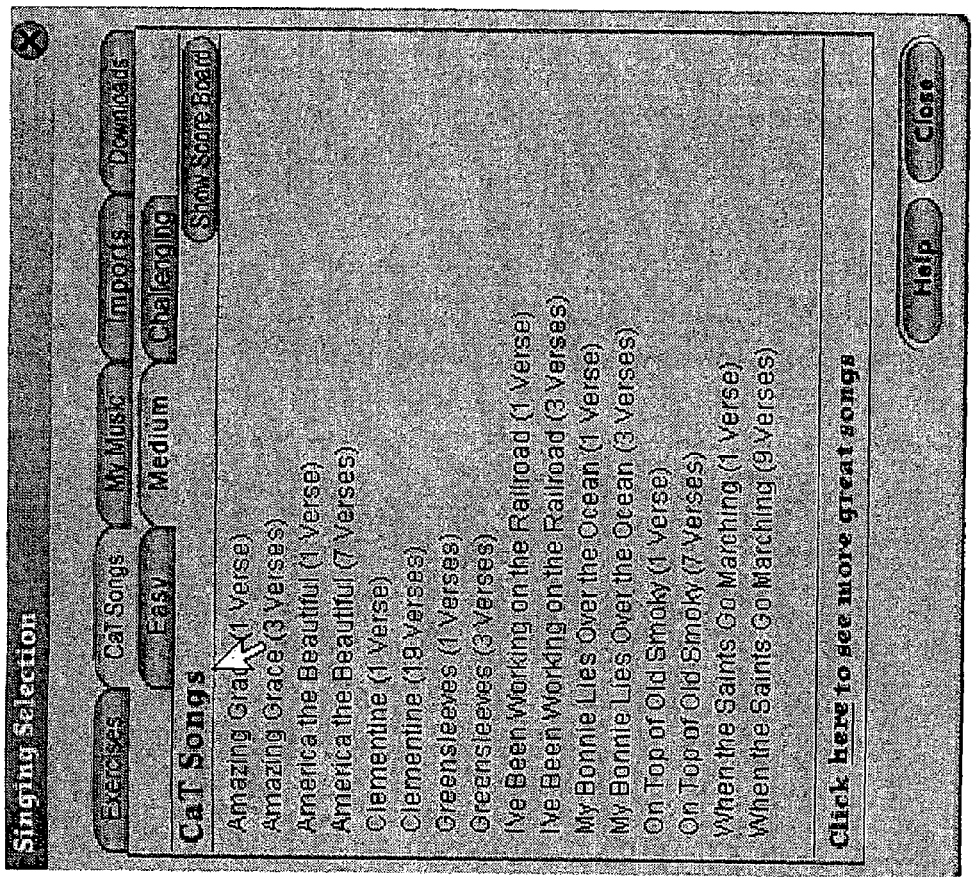
FIG. 6 illustrates the "sing window" of the invention with tabs allowing selection of various options.

The top toolbar 48TTB includes a Singing Selection button that opens a Singing Selection window. FIG. 6 illustrates the Singing Selection window having tabs for allowing the user to select an easy, moderate or challenging song that had been previously downloaded (and if sung by this user, their previous scoring thereof), a series of exercises that may be sung (i.e., unisons, intervals or warm-ups), created songs, imported songs and downloaded songs.

The top toolbar 48TTB further includes a Vocal Range button that allows the user to manually override the user-specific vocal range 46 and select a bass, baritone, tenor, alto, or soprano vocal range. The top toolbar 48TTB further includes a Skill Level button allowing the user to select the desired skill level. A toggle Sing/Compose button allows the user to switch between the sing and compose modes of operation. Finally, the top toolbar 48TTB includes toggle Keyboard, Sheet Music, Mixing Board and Home buttons to switch to a view containing a representation of a keyboard, to the Sheet Music view, to a view containing a mixing board and to return to the Home screen (see FIGS. 7a, 7b, 7c and 7d, respectively.

The right and bottom toolbars 48RTB and 48BTB comprise vertical and horizontal sliders to allow the Sing Window 48 to be scrolled vertically and horizontally, respectively. To change how much of a song appears in the Sing window, the Sing Window may also be zoomed in or out on by zoom controls. The vertical zoom control is preferably located immediately below the vertical slider on the right toolbar 48RTB and changes the number of pitch lines visible in the window. The horizontal zoom control is preferably to the left of the horizontal slider on the bottom toolbar 48BTB and changes the number of measures that appear in the Sing Window.

Best Fit and Vocal Range (VR) Fit buttons preferably located on the bottom toolbar 48BTB provide vertical display controls to adjust the vertical display so that the highest and lowest notes of a song or exercise will appear in the Sing Window without scrolling and to adjust the vertical display so that the user-specific vocal range fits in the window.

The lower control panel 48CP allows the user to control how a song is played and includes a Metronome toggle button to turn a metronome sound on and off, a Time Signature toggle button to show the currently selected time signature, a Tempo selector button that displays the current tempo and allows the tempo for the current song or exercise to be increased or decreased, a Key selector button that allows the user to change the key for the current song, thereby overriding the manually optimum key that corresponds to the user-specific vocal range, Melody and Accompaniment toggle buttons to turn on and off the melody and accompaniment (i.e., a cappella) during playing, Volume Controls selector buttons including a Master Volume slider, a Melody slider and an Accompaniment slider, Transport buttons for clearing the display and preparing for a new session, for rewinding by moving the vertical cursor to the beginning of a song, for playing what is displayed and for stopping the playing. It is noted that the current position in the song being played is indicated by a vertical cursor line.

Figure 8A:
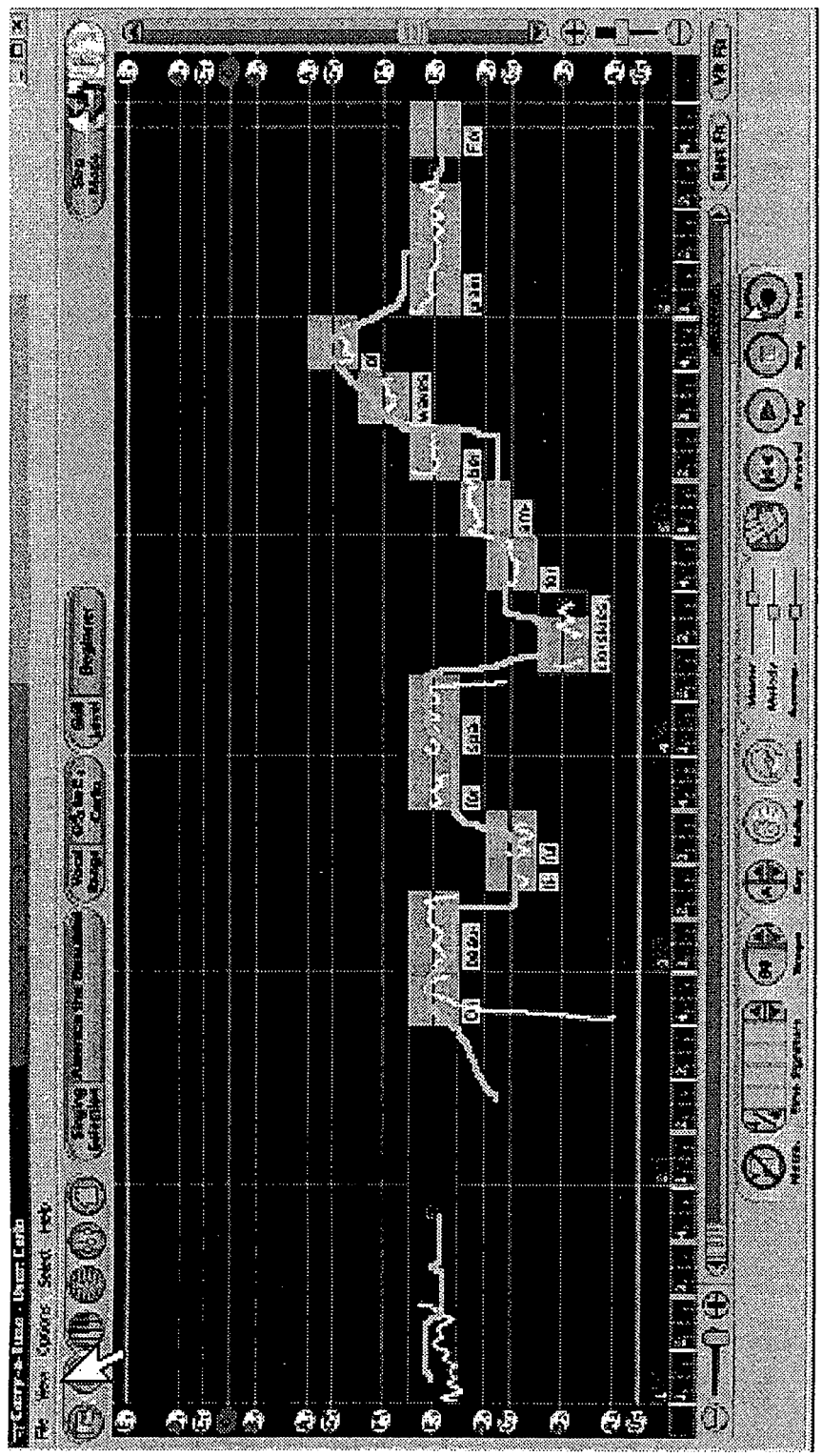
FIG. 8a illustrates a single sing window containing two pitch tracking lines for two users.
Figure 8B:
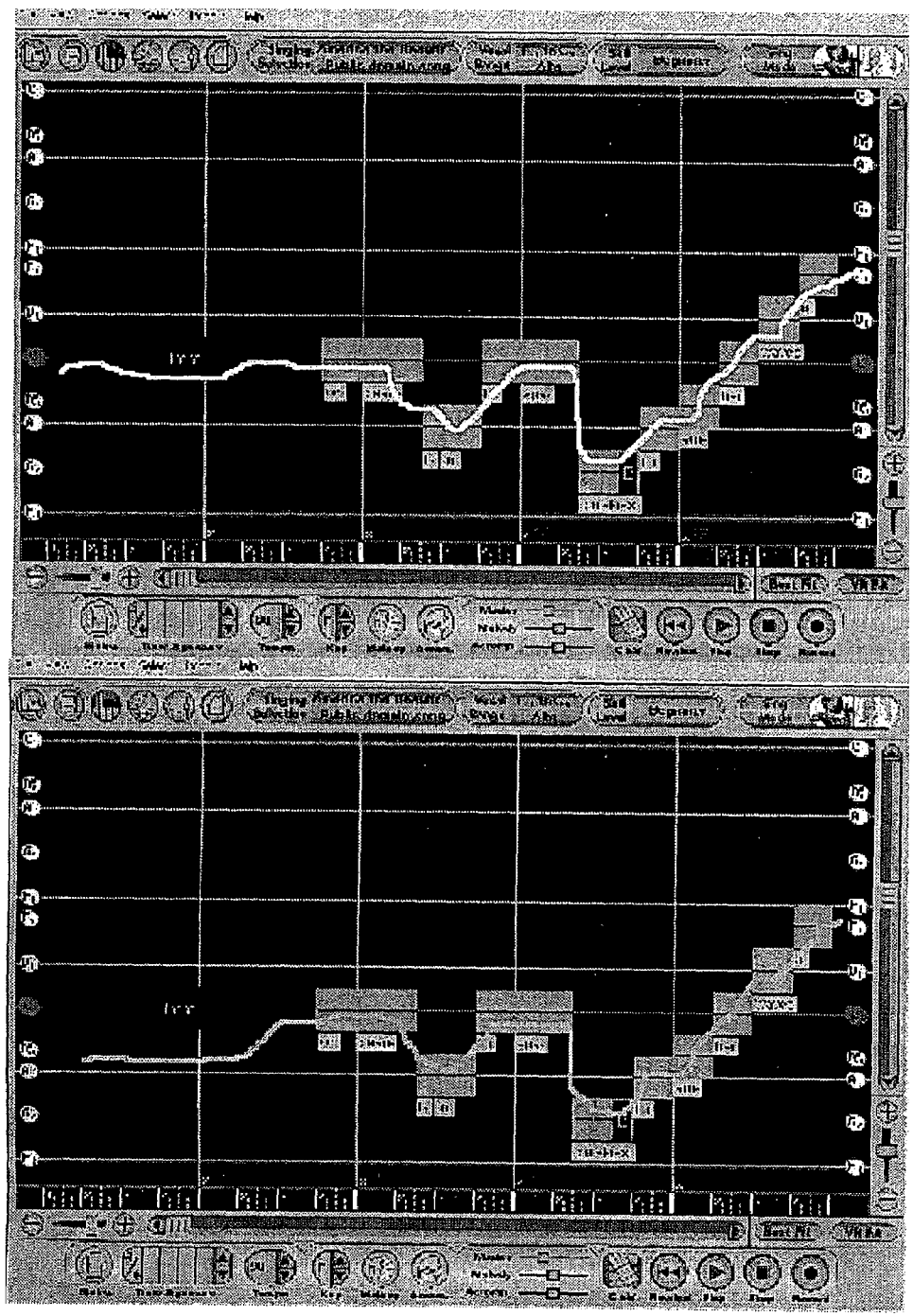
FIG. 8b illustrates two sing windows, stacked one on the other, for use by respective two users.

The invention may be used by two or more singers to practice their singing. More particularly, in the case of two users as shown in FIGS. 8a and 8b, either two pitch tracking lines (one for each user) may be displayed in the same Sing Window or two Sing Windows (one for each user) may be displayed in a stacked arrangement, each with their own or individually-used toolbars and control panels discussed above. Similarly, four users may be displayed in four Sing Windows displayed in four quadrants of a display or, if two displays are available (i.e., adjacent monitors) the four users may be displayed in two stacked Sing Windows in each of the displays. For multiple users, it is noted that the computer 28 would include multiple inputs 14 (e.g., separate audio cards or USB ports) for the user's respective microphones 16.

Figure 9A:
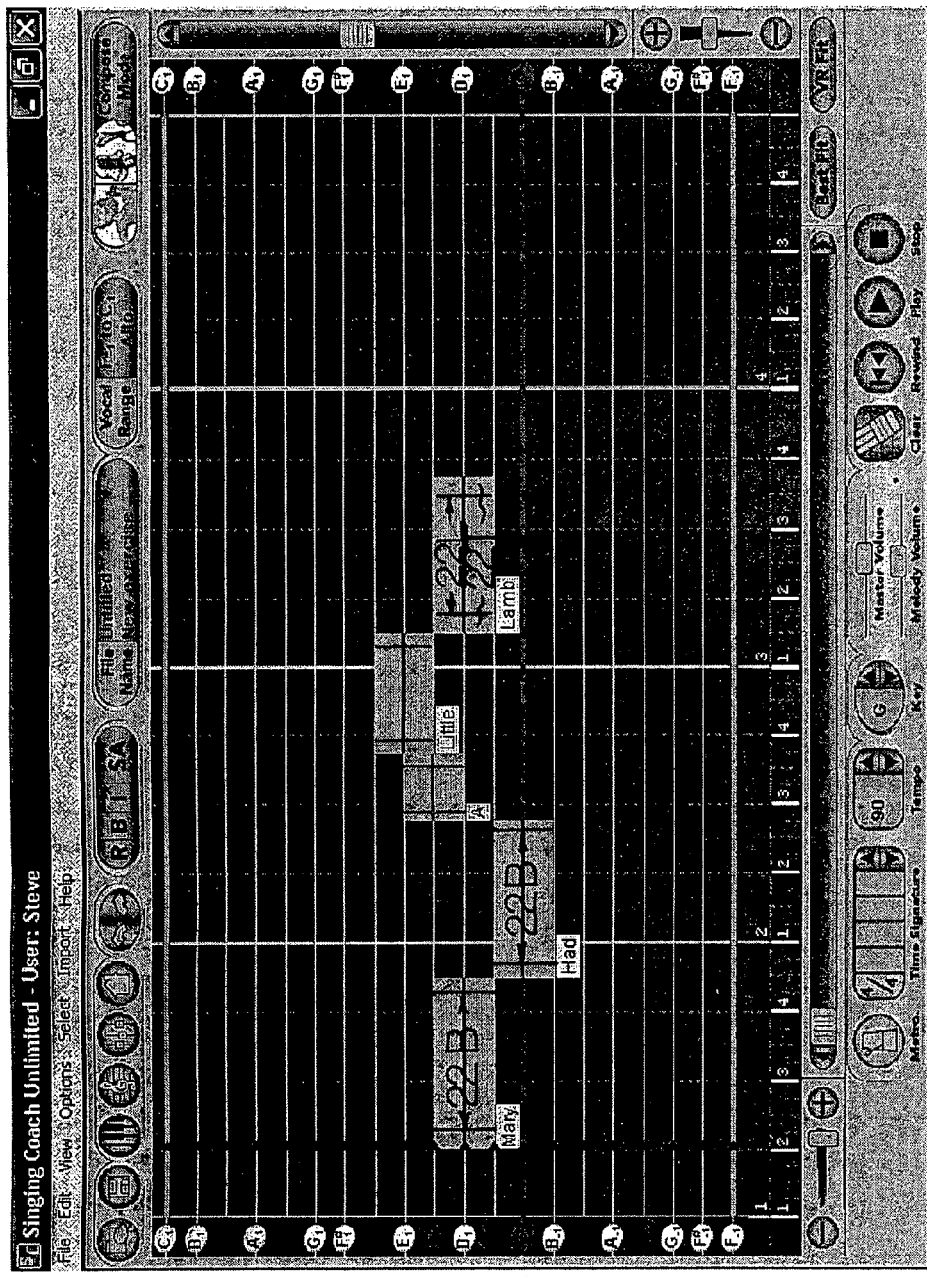
FIG. 9a illustrates a compose window allowing the user to create a song.
Figure 9B:
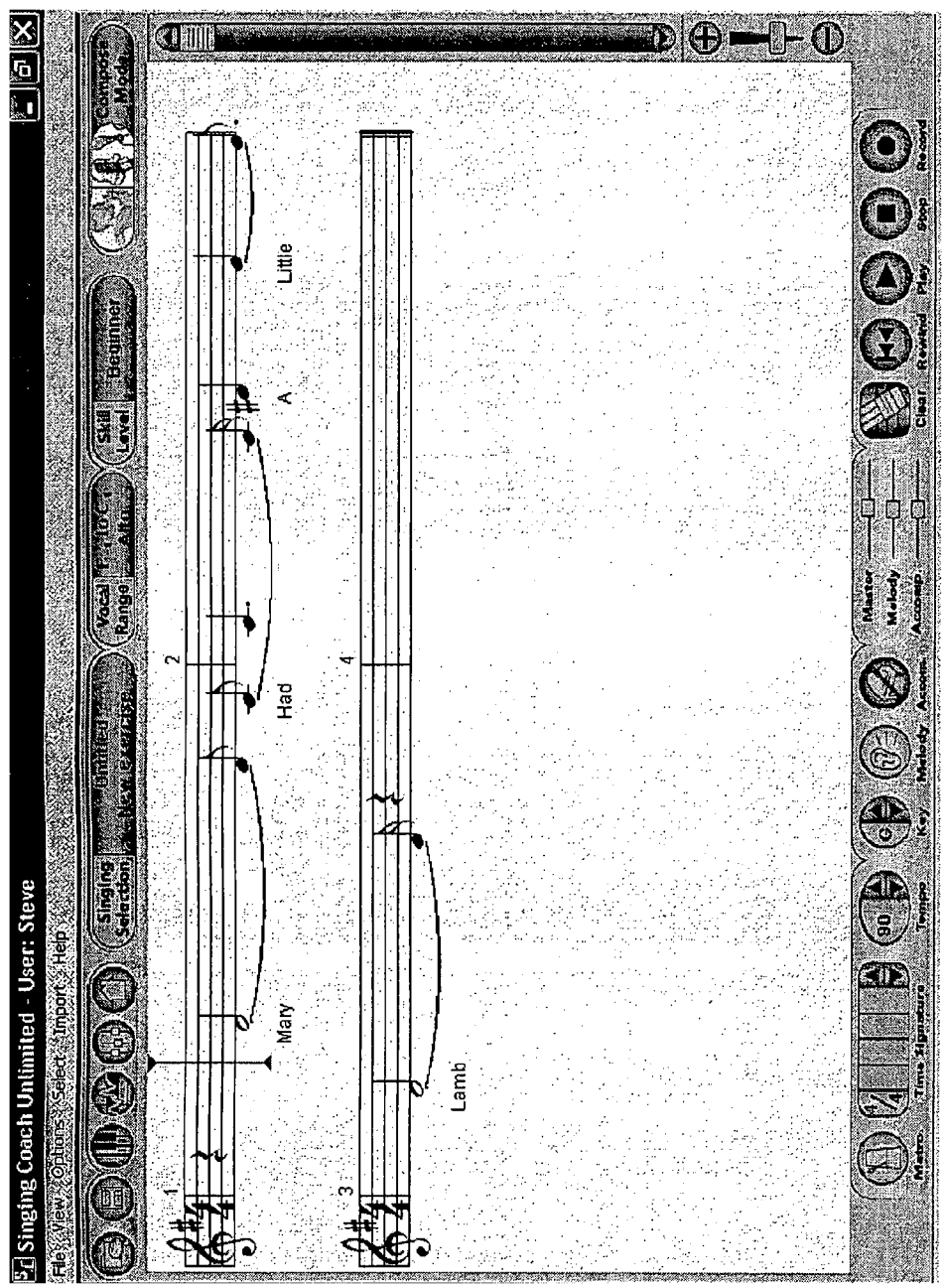
FIG. 9b illustrates the composed song of FIG. 9a in sheet music view.

As shown in FIG. 9, the computer program 36 of the invention allows a user to create a song via a Compose Window by simply creating the desired length target pitch boxes 22B for each note of the song being created. Further, the desired lyrics of the song may be textually entered at the bottom of each target pitch box 22B. Once created, the song may be saved to memory and played in the same manner as any previously-recorded song.

Figure 7A:
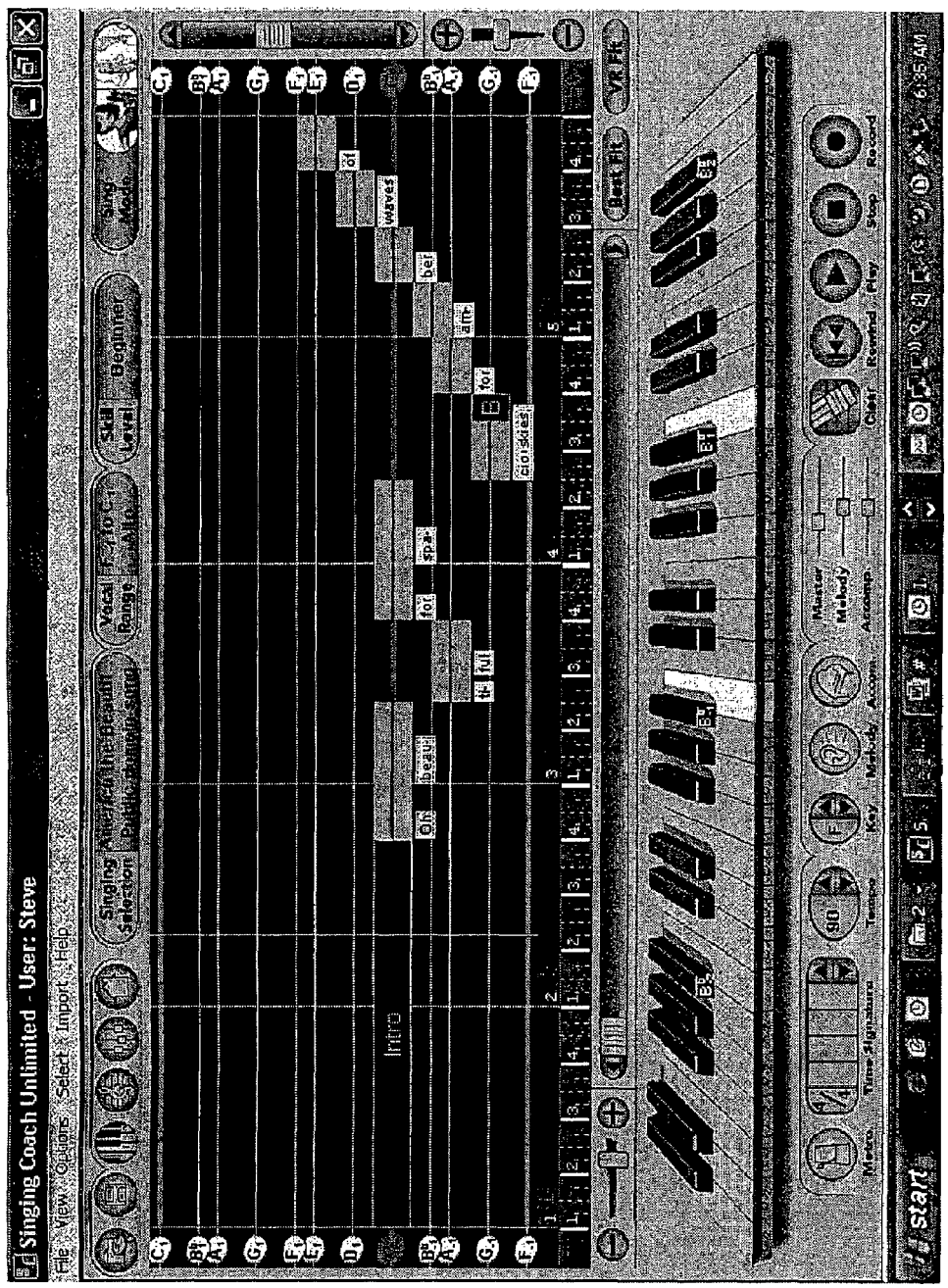
FIGS. 7a, 7b, 7c and 7d depict the keyboard view, sheet music view, mixing board view and home view screens, respectively.
Figure 7B:
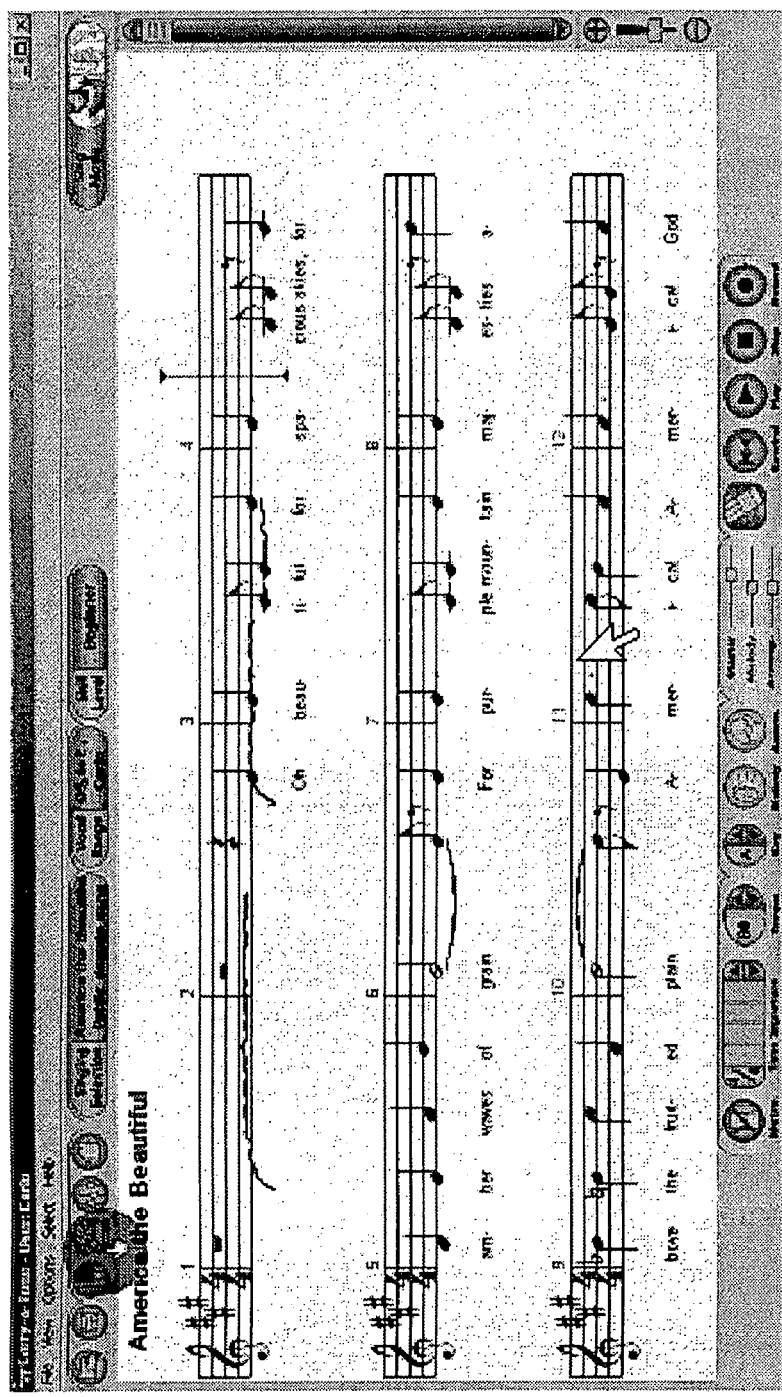
Figure 7C:
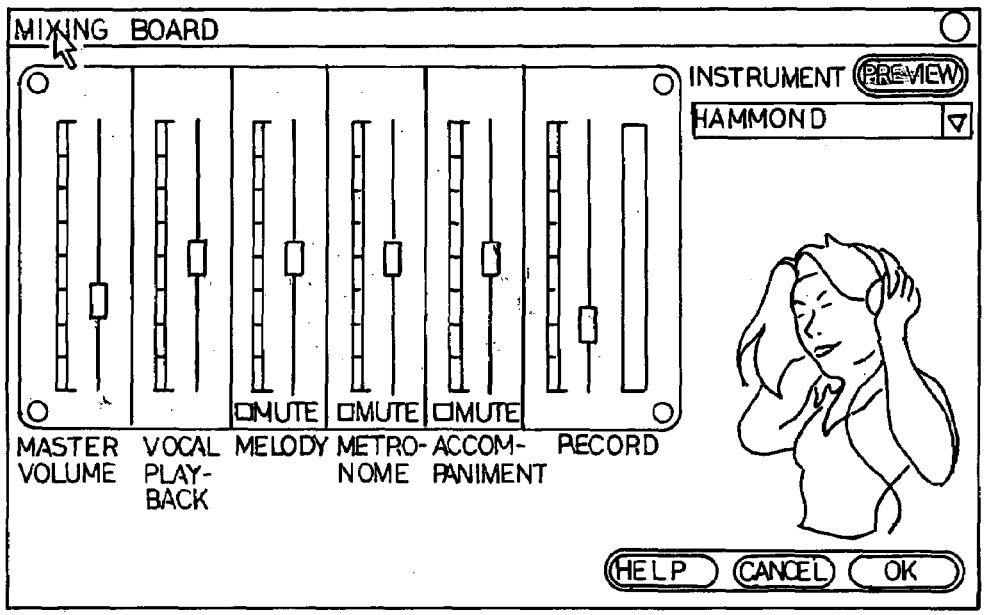
Figure 7D:
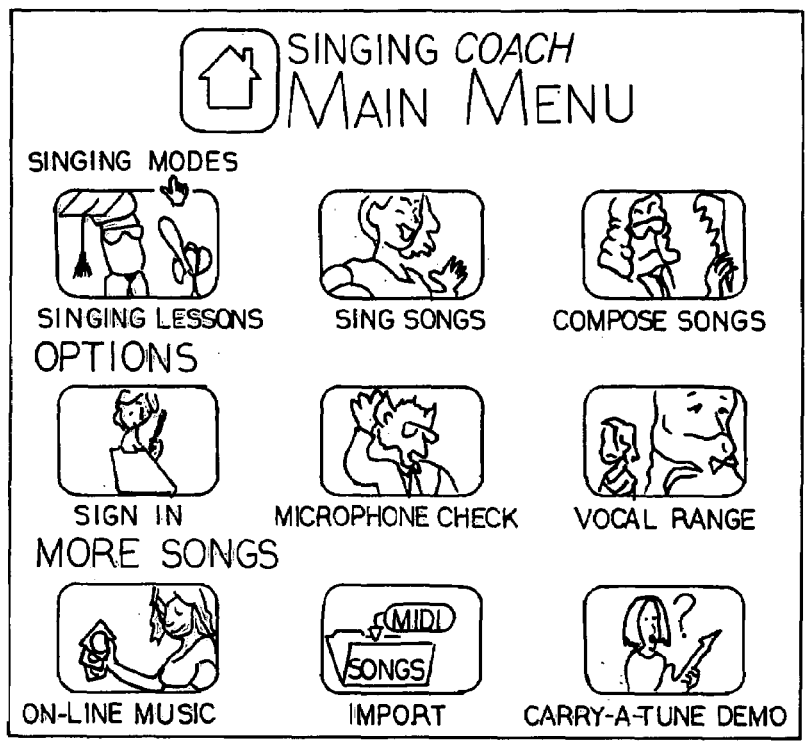

As depicted in the Home Screen of FIG. 7d, Singing Mode buttons are provided for a Singing Lessons utility, the Sing Songs utility and the Compose Songs utility. Option buttons are included for a Sign-In utility to allow a user to sign in, for a Microphone Check utility to verify the performance of the microphone 16 and for the Vocal Range utility to create a user-specific Vocal Range or to retrieve from memory one previously created to then be used or modified. Finally, the Home Screen further includes More Songs and Demo buttons for accessing an On-Line Music Store to purchase songs, an Import utility for importing songs and a Demonstration utility for demonstrating, via a recorded audio/video, the various features of the computer program 36.

The foregoing has described the functionality of the subject invention in general terms without reference to any particular proprietary or industry-standard format for the song files. It should be appreciated that while many file formats are possible, the preferred embodiment of the subject invention is best implemented through the use of industry-standard MIDI (Musical Instrument Digital Interface) file formats for the songs to be played. By way of background, every MIDI song file comprises performance data recorded by a MIDI sequencer in the form of well-defined MIDI structures including sequential status bytes and corresponding data bytes that together define a communications protocol for instructing a MIDI synthesizer how to play the song. Unlike a WAV or other analog recording of a song, a MIDI file does not contain any analog data. A more complete description of MIDI files may be found in *The Complete MIDI 1.0 Detailed Specification*, the disclosure of which is hereby incorporated by reference herein, available from the MIDI Manufacturers Association's website www.midi.org.

More particularly, when a particular song is to be displayed on the Sing Window 48, the computer program of the invention 36 reads the MIDI file of that particular song from memory (e.g., hard disk, CD-ROM, etc.) and interprets the MIDI structures to ascertain the status bytes and the data bytes for each note and its duration, as well as the key, melody and the accompaniment. From this interpreted MIDI information, the computer program has all of the information needed to draw the Sing Window 48 target pitch lines in the Sing Window 48. The computer program then draws the target pitch boxes 22B about the target pitch lines at the desired skill level. The target pitch boxes are then used to then compute the baseline for scoring.

As the user sings the song, the computer program 36 records the user's voice in analog form such as in a time-stamped WAV file corresponding to the MIDI song file. A pitch tracking algorithm in the computer program computes the X-Y coordinates of the pitch tracking line and time-stamps them to superimpose them on the Sing Window. The coordinates and time stamps of the pitch tracking line are saved to a control file corresponding to the WAV file whereupon the control file may be subsequently read to reconstruct the pitch tracking line of the user's previous singing of the song and displayed on the Sing Window with the target pitch boxes 22B. Alternatively, instead of storing the coordinates and time stamps of the pitch tracking line in a control file, the pitch tracking line may be simply recomputed upon the playing of the WAV file to replay the previously-recorded singing of the song.

The computer program may change the song's key, melody and accompaniment by changing the corresponding status and data bytes of the MIDI song file before playing. Upon playback, the computer program plays the MIDI file and the voice file in separate threads such that they are synchronized during playback.

As noted above, the computer program allows a user to compose a song. Composed songs are preferably sequenced by the computer program into a MIDI file and stored as a MIDI file to be played as noted above in synchrony with the user's WAV file containing his or her voice.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A method for learning, comprising the steps of:
    displaying a series of target pitch lines representative of target pitches on a display;
    displaying a target pitch box encompassed about each target pitch line;
    computing a pitch tracking line from an audio input; and
    displaying the pitch tracking line on the display;
    whereby the pitch tracking line visually appears within respective target pitch boxes when the pitch of the audio input is substantially in tune with the targeted pitch of the target pitch line therein by a predefined amount.

2. The method for learning as set forth in claim 1, wherein the pitch tracking line is displayed in real time.

3. The method for learning as set forth in claim 2, wherein each target pitch line is centered within their respective target pitch box.

4. The method for learning as set forth in claim 3, wherein at least one of the target pitch boxes comprises a height indicative of the degree of the audio input being substantially in tune with the targeted pitch of the target pitch line therein.

5. The method for learning as set forth in claim 4, further comprising the step of reducing the height of at least one of the target pitch boxes to increase the degree of the audio input being substantially in tune with the targeted pitch of the target pitch line therein.

6. The method for learning as set forth in claim 5, wherein the step of reducing the height of at least one of the target pitch boxes comprises the step of allowing selection of beginner, intermediate, and expert skill levels respectively corresponding to the target pitch box including an increased height, a medium height or a reduced height.

7. The method for learning as set forth in claim 3, wherein at least one of the target pitch boxes comprises a length substantially equal to the length of the respective target pitch line.

8. The method for learning as set forth in claim 7, further comprising the step of reducing the length of at least one of the target pitch boxes to define a transition time with an adjacent target pitch box.

9. The method for learning as set forth in claim 8, wherein the step of reducing the length of at least one of the target pitch boxes comprises the step of allowing selection of expert, intermediate and beginner skill levels respectively corresponding to the target pitch box including an reduced length, a further reduced length and a still further reduced length.

10. The method for learning as set forth in claim 9, wherein the step of reducing the length of at least one of the target pitch boxes occurs at the beginning of the target pitch boxes.

11. The method for learning as set forth in claim 9, wherein the step of reducing the length of at least one of the target pitch boxes occurs at the beginning and at the end of the target pitch boxes.

12. The method for learning as set forth in claim 1, wherein the audible input comprises a microphone.

13. The method for learning as set forth in claim 12, wherein the audio input comprises a person who is making an audible sound into the microphone.

14. The method for learning as set forth in claim 13, further including the lyrics of a song to be sung being positioned proximate to the respective target pitch boxes and wherein the target pitch lines represent the musical notes of the song, whereby visualization of the pitch tracking line and target pitch boxes provides a real-time visual feedback of the pitch of the singer's voice relative to each note of the song being sung to aid the person to sing in tune with the notes of the song.

15. The method for learning as set forth in claim 13, further including text to be read being positioned proximate to the respective target pitch boxes and wherein the target pitch lines represent tones of the text to be read, whereby visualization of the pitch tracking line and target pitch boxes provides a real-time visual feedback of the pitch of the person's voice relative to the text being read to aid the person to better learn the text.

16. The method as set forth in claim 1, wherein the step of computing the pitch tracking line comprises a computer and wherein the steps of displaying comprise display.

17. The method as set forth in claim 16, wherein the computer comprises a general purpose personal computer, a dedicated computer or a server computer.

18. The method as set forth in claim 17, wherein the input and the display comprises a videophone or cell phone with a display and wherein the computer is remotely located.

19. The method as set forth in claim 1, further including the steps of determining the user's actual vocal range and transposing the target pitch lines into the optimum key best corresponding to the user's actual vocal range.

20. The method as set forth in claim 1, further including the steps of determining the user's actual vocal range and moving the target pitch lines up or down one or more octaves.

21. The method as set forth in claim 1, further comprises a step of determining the user's actual vocal range comprises have the user first sing up from a low note to a high note and then sing down from a high note to a low note and defining the vocal range as the range between the high note and the low note.

22. The method as set forth in claim 19, wherein the steps of displaying occurs in a display window in which the ordinate of the window represents the transposed key best corresponding to the user-specific vocal range and the abscissa represents the measures and their beats of the target pitch lines.

23. The method as set forth in claim 22, further including the step of displaying diatonic notes and non-diatonic notes along the ordinate.

24. The method as set forth in claim 1, further including the step of displaying words associated with each target pitch line proximate to the respective target pitch box.

25. The method as set forth in claim 24, further including the step of displaying at least one empty box between adjacent target pitch boxes to serve as placeholders and signal when the user should take a breath.

26. The method as set forth in claim 1, further including the step of computing the total time the pitch tracking line appeared within the target pitch boxes relative to the cumulative length of the target pitch boxes indicative of the percentage of time the pitch tracking line was in tune with the target pitch boxes.

27. The method as set forth in claim 1, further including the step of computing the total time the pitch tracking line appeared within the target pitch boxes relative to the cumulative length of the target pitch boxes indicative of the percentage of time the pitch tracking line was in tune and on beat with the target pitch boxes.

28. The method as set forth in claim 27, further including the step of displaying a score indicative of the percentage of time the pitch tracking line was in tune and on beat with the target pitch boxes.

29. The method as set forth in claim 19, wherein the steps of displaying occurs in a display window including a toolbar and a control panel.

30. The method as set forth in claim 29, wherein the toolbar includes at least one of a singing selection button that allows the user to select among exercises, created songs, imported songs and downloaded songs, a vocal range button that allows the user to manually select a bass, baritone, tenor, alto, or soprano vocal range, a skill level button allowing the user to select the desired skill level, sing/compose button allows the user to switch between the sing and compose modes of operation, a toggle button to switch to a view containing a representation of a keyboard, to a sheet music view, to a view containing a mixing board or to return to a home screen, vertical or horizontal sliders to allow the window to be scrolled vertically and horizontally, respectively, and zoom buttons to change how much of a song appears in the window, best fit or vocal range buttons to allow the highest and lowest notes to appear in the window without scrolling and to adjust the vertical display so that the user-specific vocal range fits in the window.

31. The method as set forth in claim 29, wherein the control panel includes at least one of a metronome toggle button to turn a metronome sound on and off, a time signature toggle button to show the currently selected time signature, a tempo selector button that displays the current tempo and allows the tempo for the current song or exercise to be increased or decreased, a key selector button that allows the user to change the key for the current song, melody and accompaniment toggle buttons to turn on and off the melody and accompaniment during playing, volume controls selector buttons, and transport buttons for clearing the display and preparing for a new session, for rewinding by moving the vertical cursor to the beginning of a song, for playing what is displayed and for stopping the playing.

32. The method as set forth in claim 1, wherein the steps of displaying further includes the step of displaying a cursor line indicating the current position being played.

33. The method as set forth in claim 1, further including
computing a multiple of pitch tracking lines from respective multiple audio inputs; and
displaying the pitch tracking lines on the display.

34. The method as set forth in claim 33, wherein the set of displaying the pitch tracking lines on the display comprises the step of displaying the pitch tracking lines in multiple respective displays.

35. The method as set forth in claim 14, wherein the song to be played comprises a MIDI file.

36. The method as set forth in claim 35, further including the steps of interpreting the MIDI file to ascertain the status bytes and the data bytes for each note and its duration, as well as the key, melody and the accompaniment to display to the target pitch lines.

37. The method as set forth in claim 35, wherein as the user sings the song, the user's voice in saved in an analog file corresponding to the file.

38. The method as set forth in claim 36, wherein the coordinates of the pitch tracking line are computed for display and saved to a control file corresponding to or along with the analog file.

39. The method as set forth in claim 37, further including the step of changing the song's key, melody and accompaniment by changing the corresponding status and data bytes of the MIDI song file before playing.

* * * * *